Figure 1:
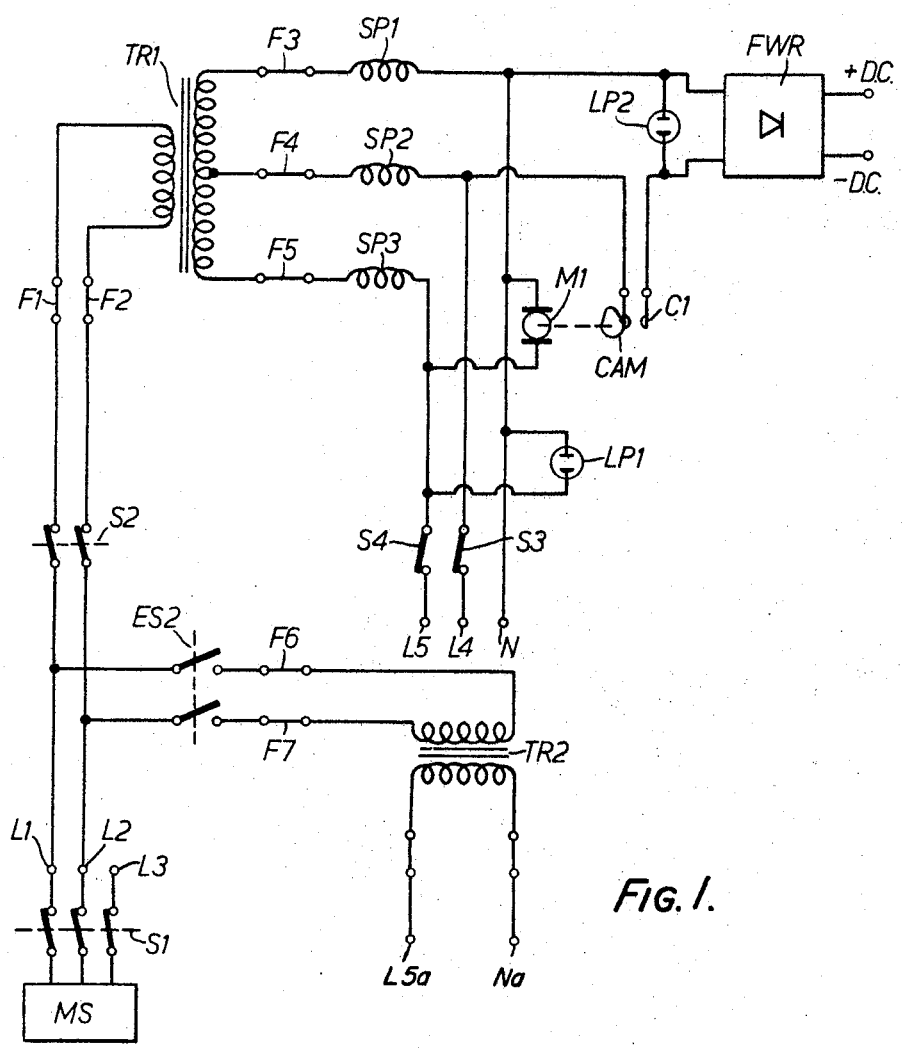

July 4, 1967 K. WATSON 3,329,339
AUTOMATIC CONTROL SYSTEMS
Filed Oct. 23, 1964 5 Sheets-Sheet 5

INVENTOR
KENNETH WATSON
BY Hane and Nydick
ATTORNEYS

United States Patent Office 3,329,339
Patented July 4, 1967

3,329,339
AUTOMATIC CONTROL SYSTEMS
Kenneth Watson, Croydon, Surrey, England, assignor to Todd Oil Burners Limited
Filed Oct. 23, 1964, Ser. No. 406,197
Claims priority, application Great Britain, Oct. 23, 1963, 41,803/63
52 Claims. (Cl. 236—26)

This invention relates to automatic control systems and is particularly concerned with such systems in which the value of a variable, such as temperature or pressure, is detected and is used to control an operating mechanism, such as a motor, controlling the variable itself, for example by varying the heat applied.

More particularly, the invention is concerned with systems of the above kind in which the said variable is a first variable which is required to be controlled in dependence upon each of two further, second and third variables. Thus in the above example of temperature or pressure as the first variable being controlled by varying the heat applied, the second and third variables may, for example, relate to the supply of oil and air to an oil burner. In fact this last example is relevant to the application for which the invention has been primarily developed, namely oil-fired boilers for marine engines.

According to the present invention in a broader aspect there is provided an automatic control system comprising a variable resistance device having a slider which is normally out of contact with the resistance, means for causing relative movement between the slider and resistance in accordance with changes in the value of a first variable to be controlled and which first variable is dependent upon each of two further, second and third variables, means for bringing the slider and resistance into contact at regular intervals and thereby generating a first voltage dependent on the relative positions of the slider and resistance each time the slider and resistance are brought into contact, means for generating a second voltage the value of which changes with adjustment of a mechanism for controlling the first variable by controlling the second and third variables in unison, means for adjusting said mechanism during said regular intervals in response to comparison of said first and second voltages, and means for maintaining a substantially predetermined relationship between said second and third variables.

In a further aspect the last mentioned means is effective in response to independent adjustment of one of said second and third variables to adjust the other to maintain the substantially predetermined relationship therebetween.

This further aspect of the invention is advantageous in applications such as that of the above example where a plurality of oil burners are employed in different numbers dependent on boiler load. In such a case the oil supply may be associated with means effective to make an effectively independent adjustment of oil supply rate to maintain a supply pressure already determined by the first variable, steam pressure say, while means responsive to such independent adjustment is effective to adjust the air supply to maintain a required oil/air ratio.

Figure 2:
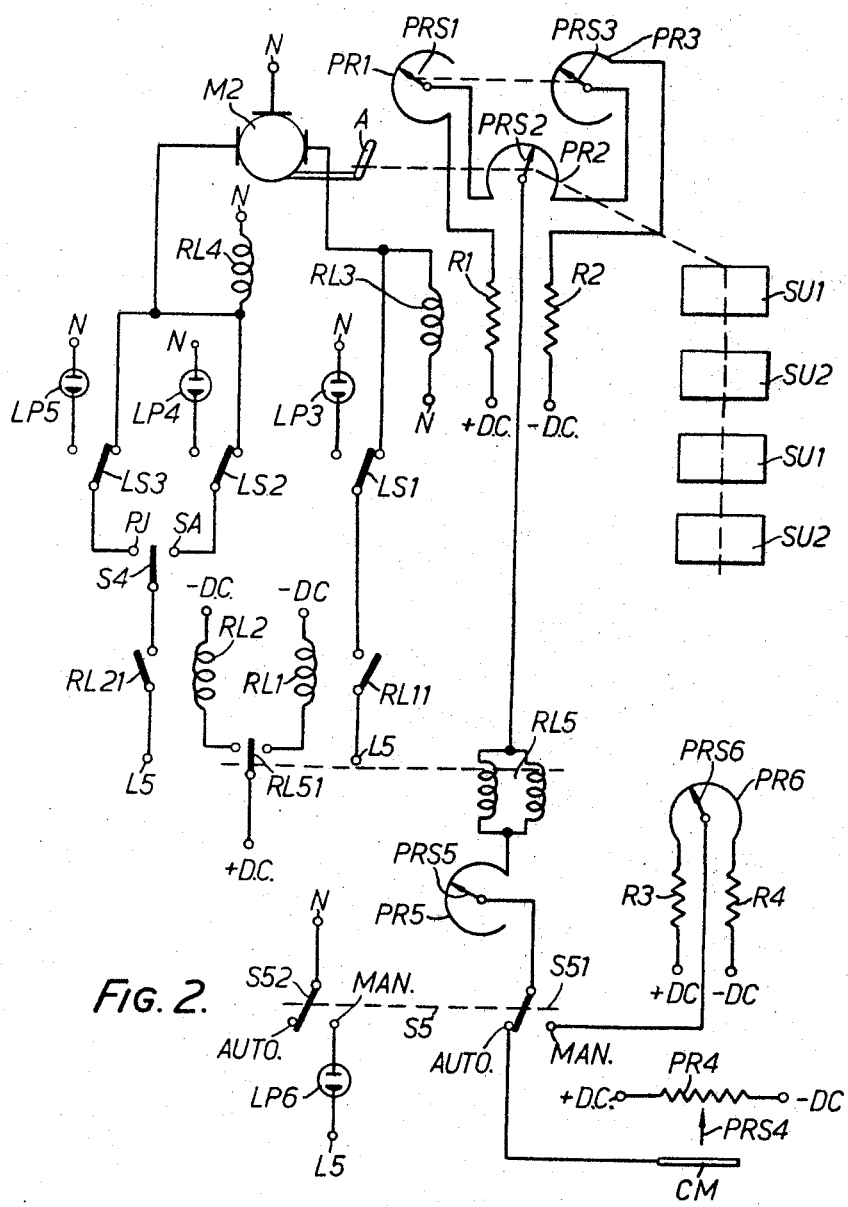
Figure 3B:
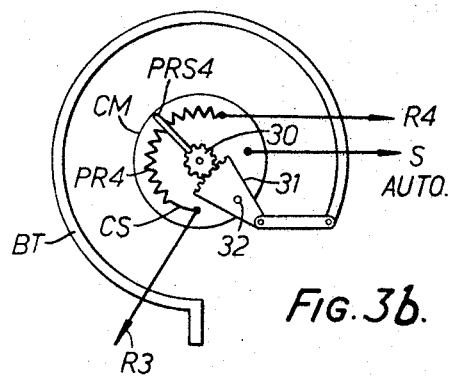
Figure 3A:
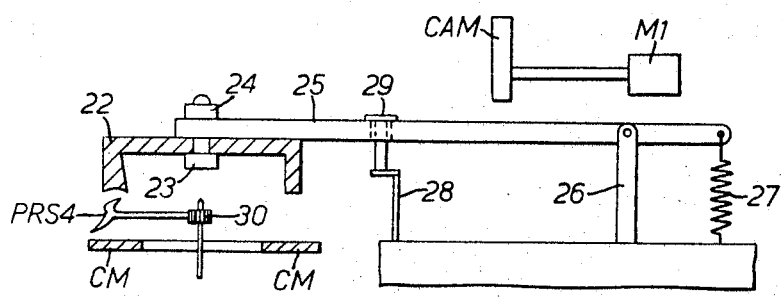
Figure 6:
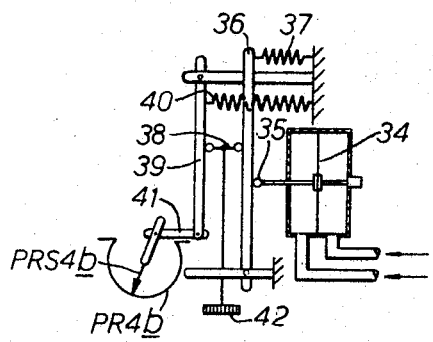
Figure 4:
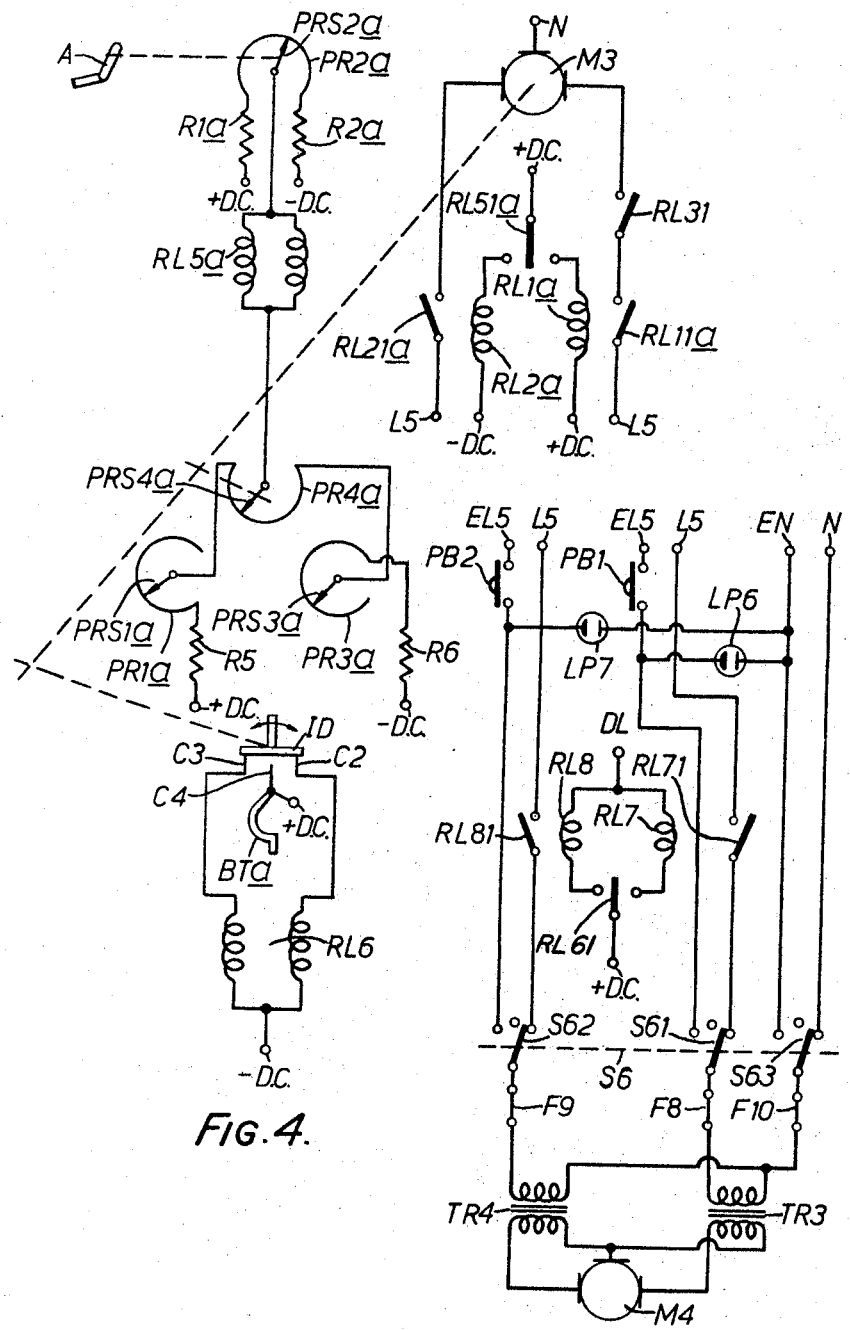
Figure 5:
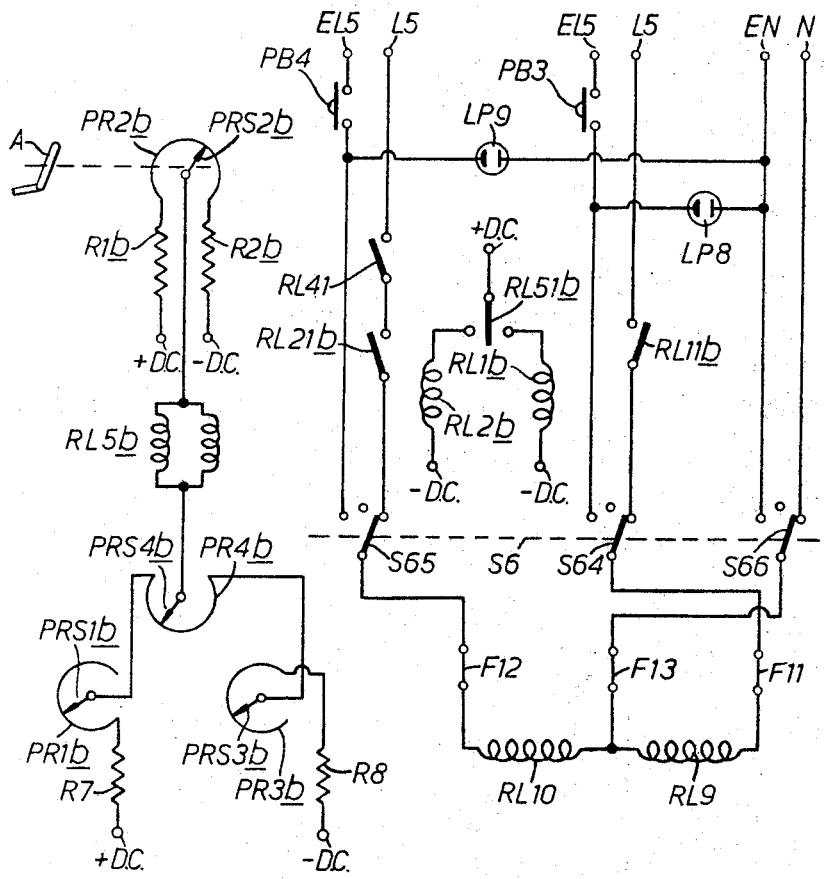
Figure 5:
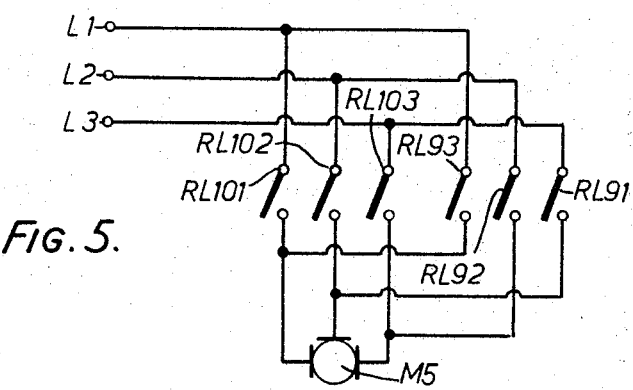

In order that the present invention may be clearly understood, the same will now be more fully described, by way of example, with reference to one embodiment of a marine engine control system illustrated by the accompanying drawings, in which:

FIGURE 1 illustrates the power supply circuits for the system in question,

FIGURE 2 illustrates the control system, other than power supply circuits, partly in circuit detail and partly in block schematic form, FIGURES 3a and 3b illustrate in greater detail some components included in the circuit of FIGURE 2, FIGURE 3a being a plan view and FIGURE 3b an elevation, partly in section, FIGURE 4 illustrates the circuit detail of one block in FIGURE 2, FIGURE 5 illustrates the circuit detail of another block in FIGURE 2, and FIGURE 6 illustrates in greater detail components included in the circuit of FIGURE 5.

FIGURE 1 concerns electrical power supplies for the control system, which supplies are derived from a main three-phase supply denoted by block MS the individual supply lines L1, L2, L3 of which pass through an isolator switch S1. Switch S1 will be located such that the control console (not shown) in which the system is housed cannot be opened for inspection or maintenance without opening the switch.

For normal operation, two of the three-phase lines, namely L1 and L2, continue through a main on/off switch S2 and individual fuses F1 and F2 to the opposite ends of a transformer TR1 primary winding. The secondary winding of transformer TR1 provides two further alternating supplies having a common neutral line N and individual live lines L4 and L5, lines N, L4, L5 having individual fuses at F3, F4, F5 and suppressors at SP1, SP2, SP3 for preventing the passage of radio frequency interference voltages from the mains supply into the direct current output.

The supply lines from TR1 secondary winding are taken from the suppressors to termination denoted N, L4, L5 for convenience and from which connections are continued to other components in the remaining drawings. Before such termination, lines L4, L5 are individually switched at S3, S4, these switches being closed during normal operation, and an indicator lamp LP1 is connected across lines N, L5 to indicate energisation of transformer TR1.

The supply across lines N, L4 is applied to a full wave rectifier FWR producing a direct current supply on positive and negative lines +DC and —DC. However, connection of input line L4 to rectifier FWR is made through normally open contacts C1 which are closed at regular intervals. For this last purpose a small alternating current motor M1 is connected across lines N, L5 to rotate a cam CAM arranged to close contacts C1 during a fraction of each cycle of cam rotation.

Also an indicator lamp LP2 is connected, after contacts C1, between lines N, L4 so that the lamp lights only during closure of contacts C1 and energisation of rectifier FWR.

In addition to the above described supplies for normal operation, provision is made for alternative supplies in the event of emergency, such as failure of the normal control system. Thus the primary winding of a second transformer TR2 is connected across lines L1, L2 in parallel with transformer TR1, and the secondary winding of TR2 provides an emergency supply on lines Na, L5a equivalent to the normal supply on lines N, L5. The emergency supply lines are individually fused at F6, F7.

It will be appreciated that the supplies on lines N, L4, L5 and Na, L5a are not purely sinusoidal since they are derived from two lines of a three-phase supply. However, they are quite adequate for the components of the system to which they are applied.

FIGURE 2 concerns what can be regarded as the master control unit for controlling, as the first variable, steam pressure by a reversible alternating current motor M2 through rotation therewith of an arm A. This master control unit is linked, through arm A, with a number of slave units SU1, SU2 respectively associated with oil and air pressure, as the second and third variables. However, the slave units are shown simply as blocks for the present.

In the master unit, motor M2 is energised for rotation in one direction or the other by D.C. relays RL1, RL2 having respective normally open contacts RL11, RL21 in connections from line L5 to the motor windings. Energisation of relay RL1 causes the motor to turn in one direction whereby the associated movement of arm A effects control adjustment for increase of burner flame height, and thus increase in steam pressure; while energisation of relay RL2 effects opposite control adjustment; motor M2 being stationary when neither of such relays is energised. The movement of arm A is through an angular movement of 90° to 120°, say, between positions corresponding to maximum and minimum burner flame heights, and limit switches are provided to define appropriate limiting positions to prevent excess motor rotation in either direction.

Accordingly, the lead from contacts RL11 to the motor windings includes normally closed contacts LS1 representing a first limit switch which is opened, when the motor reaches a suitable predetermined position, to de-energise the motor following movement for flame increase. For the case of lower limit, there are two minimum flame positions individually associated with the use of conventional pressure jets or steam assisted jets in the burners, the minimum flame height with the former kind of jet requiring significantly higher fuel supply pressures than is the case with the latter kind of jet.

Account is taken of the possible use of different kinds of burner jets, as above, by provision of a switch S4 operable to connect contacts RL21 to one or other of two parallel leads to the windings of motor M2. The selectable fixed contacts of switch S4 are indicated as PJ and SA to designate pressure or steam assisted jets and these contacts are respectively connected to the motor windings through the normally closed contacts LS2 and LS3 of second and third limit switches. Again, the limit switches are arranged for operation to open and de-energise the motor M2 when the motor reaches suitable different respective predetermined positions following movement for flame decrease.

Associated with the limit switches are indicator lamps LP3, LP4, LP5, these being respectively energised through relay contacts RL11 or RL21 when contacts LS1, LS2, LS3 are changed over to the other positions from those shown, individual lamp energisation indicating attainment of the associated limiting motor and flame height position.

Also associated with the circuit section just described are time delay relays RL3 and RL4. These relays are respectively connected between the motor energisation supply lines for increase and decrease of flame height on the one hand and the neutral line N. These relays are connected then such that one is energised simultaneously with initiation of motor M2 energisation, but the relays are of such a kind as to drop out automatically after a predetermined period independently of whether motor energisation continues beyond such period. These relays are associated with contacts in the slave control units as described hereinafter.

Turning to the control of relays RL1, RL2, these are selectively energised by contacts RL51 of a D.C. polarised relay RL5. Relay RL5 is, in turn, energised as a result of non-balance in one sense or another of a bridge circuit.

The bridge circuit in question comprises one arm formed by a series connection from +D.C. through resistor R1, potentiometer resistance PR1 and its slider PRS1, potentiometer resistance PR2, potentiometer resistance PR3 and its slider PRS3, and resistor R2 to −D.C.; while the other arm of the bridge is formed by potentiometer resistance PR4 connected between +D.C. and −D.C. The transverse connection of the bridge is made from slider PRS2 of potentiometer resistance PR2 through the windings of relay RL5, potentiometer resistance PR5 and its slider PRS5, contacts S51 of switch S5, conductive member CM and slider PRS4 of potentiometer resistance PR4.

The second arm of the above bridge circuit and the last two components of its transverse connection may be disconnected by switch S5 and have substituted therefor a potentiometer resistance PR6 connected at its different ends through resistors R3, R4 to +DC, −DC on the one hand, and the slider PRS6 of potentiometer resistor PR6 on the other hand. This substitution replaces automatic control by manual control and is effected by changing switch contacts S51 from the position shown on fixed contact AUTO to its other position on fixed contact MAN. Switch S5 has additional contacts S52 which, when manual control substitution is effected, energise an indicator lamp LP6 between N and L5 supply lines.

Before considering the operation of FIGURE 2 reference will be made to FIGURES 3a and 3b which show further details of the arrangement of potentiometer PR4 and associated components.

FIGURE 3a shows a cup shaped member 22 located by a bolt 23 and nut 24 at one end of an arm 25 pivotally supported at an intermediate point on upright 26 and biased downwardly at its other end by tension spring 27. The downwardly projecting rim part of cup member 22 is covered with resistance material over an arc of approximately 22° to form potentiometer resistance PR4. A 120° arc of copper strip gives a unipotential surface designated CS.

The cup member 22 is superposed above conductive member CM and slider PRS4 is rotatable in a plane therebetween with its free end located between, but normally out of contact with, the cup rim and conductive member. Contact between the cup rim, slider and conductive member is brought about by rotation of cam CAM which is effective to depress arm 25 sufficiently for such contact, this being arranged to occur in synchronism with closure of contacts C1 and energisation of rectifier FWR (FIGURE 1).

Movement of arm 25 in a downward direction is limited by stop 28 and movement in an upward direction is limited by the head of bolt 29 which passes through arm 25 and is secured in stop 28.

Lastly, in FIGURE 3a, slider PRS4 is carried on a pinion 30 rotated by an arcuate rack 31 pivoted at 32 and coupled to the end of a Bourdon tube BT to which is applied the steam, the pressure of which is to be controlled.

The operation of the master control unit is as follows:

On starting with a cold boiler, switch S4 is set for the type of burner jets in use, switch S5 set to contact MAN for manual control, and potentiometer PR6 is set by hand to a setting representing a safe low flame from the burners. At this time wiper PRS4 will be at a position which corresponds to atmospheric pressure and which is under a part of the cup member 22 not covered with conductive or resistance material. When the system is energised with closure of switches S1–S5, D.C. pulses are fed to potentiometers PR2, PR4, PR6 by the action of cam CAM closing contacts C1. With the bridge circuit including potentiometers PR2 and manually set PR6, an out-of-balance current is then fed through polarised relay RL5 and relay RL1 or RL2 is energised to cause the motor M2 to turn to a position such as to adjust the burner flames to a suitable height for warming up the boilers which position may, or may not, correspond to the minimum flame height. Operation of relay RL1 or RL2 will depend on the position of motor M2, when starting up the system. In any event, the motor is appropriately adjusted and energisation ceases when the bridge circuit is in balance, or by operation of LS2 or LS3, as appropriate. It will be noted that slider PRS2 follows arm A and motor M2 during such initial adjustment for warming up.

Switch S5 may then be changed over to position AUTO which operation is effective to replace the bridge circuit arm including potentiometer PR6 to that including PR4. This will not immediately alter the setting of motor M2 because each time the cup member 22 is depressed slider PRS4 contacts an insulating part so that no circuit is completed through polarised relay RL5. At the same time however, the gradually increasing steam pressure acting on the Bourdon tube BT causes slider PRS4 to move under cup member 22 until, eventually, when the member is depressed the slider, contacts the conductive strip CS. When this occurs a conductive path is established through relay RL5 and, since the potential of strip CS corresponds to a requirement for increased pressure by higher flame burner operation, relay RL5 is energised causing relay RL1 to be operated so that motor M2 is energised through contacts RL11 to increase flame height. As before motor energisation ceases when the bridge is balanced, or, more likely in practice at this stage, when limit switch contacts LS1 open.

Each time contacts C1 are closed slider PRS4 is brought into contact with strip CS and member CM, so that the setting of motor M2 is unaltered as the steam pressure increases. However when potentiometer resistance PR4 is reached, each time the slider PRS4 contacts it the potential is decreased, and there is a reduced out-of-balance current through relay RL5 until, at a point near the centre of PR4, the direction of current through the bridge transverse arm is reversed and RL2 is energised to reduce flame height. This reduction of flame continues until a state of equilibrium is reached with slider PRS4 approximately central of resistance PR4. In this equilibrium state, any further increase in pressure resulting in the slider PRS4 being turned further clockwise causes RL5, RL2 and motor M2 to operate so that the consequential reduction in flame lowers the pressure and restores the slider to the predetermined position relative to PR4. Similarly, a re-balancing operation occurs through energisation of RL5, RL1 and motor M2 in the event of a fall in pressure. The system, once it has brought the pressure to the desired value, therefore automatically maintains it at that value.

The predetermined value at which the pressure is stabilised may be altered by loosening off nut 24 and rotating the cup member 22. As seen in FIGURE 3a, for example, clockwise rotation will give rise to stabilisation at increased pressure. In the present embodiment, this last adjustment is employed as a coarse selection of working pressure, a relatively fine control of such pressure being provided by virtue of potentiometers PR1, PR3 which are adjustable in unison to effect a fine control on the bridge balance point and thus, in turn, on the working pressure.

Potentiometer PR5 is provided as a sensitivity control since the value to which it is set will determine the amount of current passing through relay RL5 for a given magnitude of non-balance in the bridge circuit. Thus adjustment of PR5 provides a control over the minimum magnitude of non-balance, that is, pressure variation from desired working value, before relay RL5 is sufficiently energised to move its operator contacts RL51.

Turning now to the actual control of burner flame height, and so pressure, effected by motor M2 this is achieved by control of the oil and air supply pressures to the burners through respective slave control units SU1, SU2. Also in the present consideration of marine application there will commonly be two boilers, port and starboard, and these may be associated with individual pairs of slave units SU1, SU2 as in fact indicated by illustration of two slave unit pairs in FIGURE 2. However, common slave units can be employed, this possibility being more relevant to a common oil pressure slave unit.

The slave units are generally similar to the master control unit in employing bridge circuits, being in large part duplications of each other and the slave units for like functions are identical. Thus, for convenience, only one slave unit of each kind SU1, SU2 will be described in detail and the same referencing, wtih the addition of $a$, will be employed in each such description for elements having similar function to those in the master unit where appropriate.

In FIGURE 4 then, which illustrates an oil pressure slave control unit, the unit includes a first bridge arm formed by a series connection from +DC through resistor R1$a$, potentiometer resistor PR2$a$ and resistor R2$a$ to —DC, while the second bridge arm is formed by a series connection from +DC through resistor R5, potentiometer resistor PR1$a$ and its slider PRS1$a$, potentiometer resistor PR4$a$, potentiometer resistor PR3$a$ and its slider PRS3$a$, and resistor R6 to —D.C. The transverse arm includes slider PRS2$a$, polarised relay RL5$a$ and slider PRS4$a$. It will be noted that, in the slave unit, potentiometers PR1$a$, PR3$a$ are associated with PR4$a$ rather than PR2$a$.

Operation of relay RL5$a$ in one sense or the other by bridge non-balance energises, in turn, relay RL1$a$ or RL2$a$ connected between contacts RL51$a$ and +D.C. on the one hand and —D.C. on the other hand. Contacts RL11$a$ and RL21$a$ are connected between the supply line L5 and the windings of a fuel supply control motor M3.

Also it will be noted that contacts RL31 of relay RL3 are connected in series with contacts RL11$a$.

In the operation of the slave unit as so far described, adjustment of motor M2 (FIGURE 2) causes adjustment of slider PRS2$a$ and resultant non-balance in the slave unit bridge. This non-balance results in appropriate energisation of relay RL5$a$ and so relay RL1$a$ or RL2$a$, which in turn causes adjustment of the oil supply pressure control motor M3 until bridge balance is attained once more, it being understood that potentiometer PR4$a$ acts as a feedback potentiometer movable with the shaft of motor M3 to indicate the required oil pressure supply.

However, operation of relay RL1$a$ with closure of its contacts RL11$a$ to increase the oil supply for increased flame height is effective only when relay RL3 and its contacts RL31 are also operated. This in fact occurs simultaneously with energisation of the associated relay RL1 (FIGURE 2) but relay RL3 drops out after a predetermined time which in practice will be shorter than the bridge balance/non-balance sampling interval. The result of this is that oil pressure increase lags behind air pressure increase, as will be seen hereinafter, and the burners accordingly do not produce significant amounts of smoke.

The shaft of motor M3 also carries an insulating disc ID supporting a pair of spaced contacts C2, C3 which co-operate with a contact C4 normally located out of contact therebetween. Contact C4 is moved about the axis of disc ID by a Bourdon tube BT$a$ which adjusts the contact position in response to the actual oil supply pressure in similar manner to variation of slider PRS4 by tube BT in response to steam pressure in the master unit (FIGURE 3$a$). Thus, contact C4 will engage contact C2 or C3 for a difference between required and actual oil supply pressure, the spacing of contacts C2, C3 determining the minimum pressure difference for such engagement and the sense of such difference determining engagement of C4 with the corresponding one of C2, C3.

This contact engagement gives rise to energisation of oil supply valve control motor M4 in the appropriate sense to increase or decrease the oil supply pressure such that contact C4 disengages. This operation is achieved in similar manner to that by relays RL5$a$ and RL1$a$, RL2$a$, and employs relay RL6 the one end of the different windings of which are connected to contacts C2, C3, while the other relay winding ends are connected to —D.C. Contact C4 is connected to +D.C., so that engagement of C4 with C2 or C3 energises RL6 to move its contact RL61 in one direction or the other whereby relay RL7 or RL8 is energised between +D.C. and —D.C.

Energisation of RL7 closes, with its contacts RL71, a circuit from supply L5 through normally closed contacts S61 of switch S6, the primary winding of transformer TR3, to supply N; and the TR3 secondary winding energises motor M4 to increase the oil supply pressure until C4 disengages. Similarly, energisation of relay RL8 closes an energisation circuit for transformer TR4 to operate motor M4 in the opposite sense for oil pressure decrease until C4 disengages.

Regarding switch S6, this is normally in the position shown, but is effective on change-over to disconnect the normal supplies N, L5 and connect the emergency supplies EN, EL5 for energisation of transformers TR3, TR4. This emergency operation is controlled by push button PB1, PB2 in the supply connections from EL5 to transformers TR3, TR4 to achieve a manually controlled stepping operation of motor M4 in one direction or the other. Indicator lamps LP6, LP7 indicate such emergency operation during respective energisation of TR3, TR4.

FIGURE 5 illustrates, in detail, the circuit of an air supply pressure slave control unit SU2 and again as with the oil control unit SU1 of FIGURE 4 there is a close similarity to the master control unit. Accordingly elements having a similar function to those in the master unit employ corresponding references with the addition of a $b$. The indicator lamps in FIGURE 5 are designated LP8 and LP9.

The major proportion of FIGURE 5 in fact operates in identical manner to operation already described for FIGURES 2 and 4 in that the same bridge circuit arrangement controls selective energisation of relay RL1$b$ or RL2$b$ for increase or decrease of combustion air supply pressure to the burners. One individual feature, however, is relay contacts RL41 which allow decrease of air supply pressure if appropriate during a bridge circuit sampling interval but only for that part of the interval before relay RL4 drops out. This has a similar effect to that of contacts RL31 in FIGURE 4 in maintaining oil pressure proportionately lower than the air, in this case by allowing a more rapid oil pressure decrease, during changes between equilibrium states whereby excessive smoke generation from the burners is avoided.

It will of course be understood that equilibrium is eventually established, but the delay relay operations are such as to let air pressure increase attain a relevant equilibrium level in advance of oil pressure increase, and vice versa for pressure decreases, and this feature is of practical significance.

Further differences of FIGURE 5 are found in the actual adjustment of air pressure. This is effected by energisation of motor M5 in one sense or the other in relation to a mechanism to be described with reference to FIGURE 6. Motor M5 is of three-phase form as distinct from the single-phase motor M4 of FIGURE 4. Energisation supplies are accordingly obtained directly from the main supply lines L1, L2, L3 through normally open relay contacts RL91–RL93 for increase in air pressure or through normally open relay contacts RL101–RL103 for decrease in air pressure. These contacts are respectively closed by energisation of relays RL9, RL10 which are in turn normally activated between supplies N, L5 by contacts RL11$b$, RL21$b$.

Again, as in FIGURE 4, an emergency facility for manually controlled operation is available from supplies EN, EL5 by changing over switch contacts S64–S66 and operating pushbuttons PB3, PB4 as required. Regarding switch S6, it will be noted that this can also be set to an off position and it will normally require to be switched over for connection of supplies N, L5 together with switches S1–S4 for automatic operation.

FIGURE 6 shows one form of suitable combustion air pressure control mechanism for operation by motor M5 and comprises a lever system controlling the position of feedback potentiometer slider PRS4$b$, the position of which lever system is controlled in turn by a diaphragm subjected to "differential" pressure. The diaphragm in question is indicated at 34 and it is subjected on one side, the right in FIGURE 6, to the pressure in the fan chamber generated by the fan and, on the other side, to the pressure in the furnace, these pressures respectively prevailing on the input and output sides of the burner jets. The diaphragm centre is connected to a member 35 controlling the position of an intermediate point of a first lever 36, pivoted at its lower end and biased by tension spring 37 at its upper end against member 35. Lever 36 controls the position of a member 38 against which a second lever 39, pivoted at its upper end, is urged by tension spring 40. At its lower end lever 39 has a connecting arm 41 controlling the position of slider PRS4$b$.

In operation of this mechanism by the slave unit of FIGURE 5 non-balance of the slave bridge requiring flame height increase causes motor M5 to open the fan damper, which will produce increased fan pressure relative to the respective furnace pressure whereby the diaphragm 34 moves to the left in FIGURE 6 and slider PRS4$b$ moves to attain bridge balance. Similarly, a reverse operation occurs for flame height decrease.

An advantageous feature of the present embodiment is that when one of several burners is shut off and withdrawn with decrease of boiler load then the oil supply rate is automatically adjusted by the unit of FIGURE 4 to maintain the same oil pressure for the reduced number of burners and the damper is correspondingly adjusted to maintain the same air pressure as before. This damper adjustment arises from the fact that with closure of one burner the fan chamber pressure will increase relative to furnace pressure and the diaphragm, lever system and slider PRS4$b$ move to indicate excess air pressure. The resultant bridge non-balance will cause the relevant relay RL2$b$ to be energised for damper-opening reduction until balance is attained once more.

In this way, the air/oil ratio of the fuel supply is maintained substantially constant.

A reverse operation occurs in the case where an additional burner is brought into operation with increased boiler load. In fact, control of the number of burners in use can be effected automatically with reference to the limit switches LS1 and LS2 or LS3 and the D.C. pulsed supply. Thus one can readily provide a programme control having stepping means respectively operated by the D.C. pulses, when the high or low flame limit switch is activated, to successively reduce or increase the number of burners in use, whereby the burners in use at any time will normally be operating with a suitable intermediate flame height other than maximum or minimum heights. For example, the first D.C. pulse or predetermined group of pulses to follow operation of the low flame limit switch may cause a specified burner to be extinguished, the next pulse or pulse group may cause the extinguished burner to be purged with steam, and the third pulse or pulse group may cause the purged burner to be withdrawn.

Naturally, in such an operation, the pressure may thereafter fall as a result of decreased heating with less burners and the main control unit will therefore subsequently act to increase fuel supply pressures. However, in the meantime the ratio of air/oil is maintained at a given value for efficient burner operation. Moreover, the values of such ratio can be substantially predetermined by longitudinal adjustment of the position of member 38 between levers 36 and 39 by means of knob 42 through a nut and screw connection (not shown). Fine control of such ratio can be effected by adjustment of the settings of potentiometers PR1$a$, PR3$a$ and PR1$b$, PR3$b$ in the oil and air slave control units.

Particular component or other values found suitable in one construction of the above embodiment, which is itself given by way of example, are as follows:

| | | |
|---|---|---|
| L1, L2, L3 | volts | 440 |
| L4 | do | 100 |
| L5, EL5 | do | 230 |
| TR3, TR4 | do | 230/24 |
| F1, F2, EF1, EF2 | amps | 5 |
| F3 to F7 | do | 2 |
| F8 to F13 | do | 3 |
| R1, R2, R5, R6, R7, R8 | | 0.35K$\Omega$ |
| R1$a$, R2$a$, R1$b$, R2$b$ | | 0.5K$\Omega$ |
| R3, R4 | | 0.75K$\Omega$ |
| PR1, PR3, PR1$a$, PR3$a$, PR1$b$, PR3$b$ | | 0.3K$\Omega$ |
| PR2, PR2$a$, PR2$b$ | | 1K$\Omega$ |
| PR4 | | 2K$\Omega$ |
| PR5 | | 50K$\Omega$ |
| PR6 | | 0.5K$\Omega$ |

In the overall operation of the above system the periodic sensing of the bridge circuits, by effectively switching the D.C. supply is advantageous in that the controls tend to settle in the intermediate periods between sensing. In other words the tendency is to approach stabilisation in a series of "bites" during sampling with the result that the system is not prone to difficulties in "hunting" around the required stabilisation state as is so often the case with continuously operating automatic control systems. Also, by the same token, the manner of sensing potentiometer PR4 in the master control unit by bringing it into contact with its slider only during sensing intervals is advantageous in that there is no frictional restraint on the slider for a significant proportion of the time.

Regarding this last point, the above-described use of cam operation to obtain sensing contact of PR4 and its slider is preferred in that such contact may be obtained more smoothly than is the case with other operations such as relay actuation for contact, say, although other such operations are quite practicable.

The system is found to operate satisfactorily with a sensing period of about 2 seconds at a frequency of 16 times per minute, although other sensing periods and frequencies are not excluded and may be more satisfactory or economic in different applications. Thus it may be desirable that motor M1 be a variable speed motor so the sensing frequency can be varied. At the same time different cam forms can be employed for different sensing periods.

For high accuracy of control in operation, the change of resistance per unit angular change of slider PRS2 is less than the corresponding change for slider PRS4. Thus, from the above-mentioned values given by way of example, PR4 spans an arc of 22° and has a resistance of 2K$\Omega$ while PR2 has a resistance of 1K$\Omega$ and may span an arc of 300°. With these values, any angular movement of slider PRS4 results in a movement of slider PRS2 which is 27 times greater, and the system is capable of keeping the pressure constant to ±1% of working pressure.

If desired the system may be controlled manually by retaining switch S5 in position MAN. The burner flame height is then adjusted by operating potentiometer PR6. When the system is under manual control lamp 33 is continuously illuminated. As a further facility reference has been made to the provision of emergency operation.

Finally although the present invention has been more particularly described as applied to the control of pressure, it may equally well be applied where suitable to the control of other variables dependent on two or more further variables. However, since the development of the invention has occurred in relation to oil/air pressure control for oil burner installations some of the features, such as relays RL3 and RL4 are of particular advantage in specialised applications.

I claim:

1. An automatic control system comprising a variable resistance device having a slider which is normally out of contact with the resistance, means for causing relative movement between the slider and resistance in accordance with changes in the value of a first variable to be controlled and which first variable is dependent upon each of two further, second and third variables, means for bringing the slider and resistance into contact at regular intervals and thereby generating a first voltage dependent on the relative positions of the slider and resistance each time the slider and resistance are brought into contact, means for generating a second voltage the value of which changes with adjustment of a mechanism for controlling the second and third variables in unison, means for adjusting said mechanism during said regular intervals in response to comparison of said first and second voltages, and means for maintaining a substantially predetermined relationship between said second and third variables.

2. An automatic control system comprising a first electrical resistance bridge circuit having a first resistance arm connected between positive and negative D.C. first electrical supplies, a second resistance arm connected between said D.C. supplies, and a first transverse connection terminating in respective first and second sliders for said first and second arms, said first slider being normally out of contact with said second arm; means for varying the relative disposition of said first arm and slider in accordance with the actual value of a first variable which is to be controlled and is dependent upon each of two further, second and third variables; a mechanism for varying the connection point of said second arm and slider; bridge sampling means for bringing said first arm and slider into contact during regular intervals; first adjustment means responsive to current flow in said transverse connection during said intervals to adjust said mechanism towards a condition establishing equilibrium in said first bridge circuit; control means responsive to said mechanism to determine, in unison, required values in a predetermined proportion for said second and third variables during said intervals; and second adjustment means responsive to said control means to adjust said second and third variables to their respective required values and to maintain said predetermined proportion.

3. A system according to claim 2 wherein said control means comprises a second electrical resistance bridge circuit having a third and a fourth resistance arm connected between said D.C. supplies, and a second transverse connection terminating in respective third and fourth sliders for said third and fourth arms, the connection point of said third arm and slider being determined by said mechanism during said intervals; and third adjustment means for determining the connection point of said fourth arm and slider in accordance with the required value of one of said second and third variables during said intervals.

4. A system according to claim 3 wherein said third adjustment means comprises first and second electrical contact members having predetermined mutual spacing, adjustable disposition in unison with the connection point of said fourth arm and slider, and individually connected through different ones of two first electrical activation means to a common one of said D.C. supplies; and a third electrical contact member adjustable in accordance with the actual value of said second variable, and connected to the other one of said D.C. supplies.

5. A system according to claim 4 wherein said third adjustment means further comprises first setting means for setting the actual value of said second variable, and a first energisation circuit for said first setting means operable in opposite senses in response to different ones of said first activation means.

6. A system according to claim 5 comprising a first electrical supply circuit directly connected to said first energisation circuit; a normally open second electrical supply circuit; second switch means operable to alternatively connect said first setting means to said first energisation circuit and said second supply circuit; and third switch means for closing said second supply circuit in opposite senses.

7. A system according to claim 3 wherein said third adjustment means comprises second setting means for setting the actual value of said third variable, and a second energisation circuit for said second setting means operable in opposite senses in response to opposite sense current conduction through said second transverse connection.

8. A system according to claim 7 comprising a first electrical supply circuit directly connected to said second energisation circuit; a normally open third electrical supply circuit; second switch means operable to alternatively connect said second setting means to said second energisation circuit and said third supply circuit; and fourth switch means for closing said third supply circuit in opposite senses.

9. A system according to claim 3 and comprising means rendering said D.C. supplies effective only during said intervals under the control of said bridge sampling means.

10. A system according to claim 1 comprising time delay means responsive to adjustment of said mechanism in opposite senses to terminate corresponding adjustment of the different ones of said second and third variables before termination of individual ones of said intervals.

11. A system according to claim 10 wherein said first, second and third variables respectively represent steam, oil and combustion air pressures in an oil burner fired boiler; and wherein said time delay means comprises a first and second such means respectively operable in response to increase and decrease of said variables to terminate oil pressure increase and air pressure decrease before termination of individual ones of said intervals.

12. A system according to claim 2 comprising a fifth resistance arm connected between said D.C. supplies and a fifth slider therefor, the relative disposition of said fifth arm and slider being manually adjustable; and first switch means operable to substitute said fifth arm slider for said first arm and slider for initiation of said system in use.

13. A system according to claim 12 wherein said first transverse connection comprises a first manually adjustable potentiometer connected in series between said switch and said second slider, whereby the range of variation of current conduction in said first transverse connection is adjustable for the range of first bridge circuit balance variation.

14. A system according to claim 13 wherein said second arm comprises a series connection of second potentiometer, resistor and third potentiometer, said second and third potentiometers are manually adjustable in unison whereby the range of control of said first variable is adjustable.

15. A control system comprising a first unit responsive to a difference of a first variable from a desired value of that variable, second and third voltage controlled units for respectively controlling second and third variables, the second and third units being linked in mutually independent fashion to said first unit so that an indication of a difference of the first variable from the desired value therefor will be presented to said second and third units for effecting adjustment of the second and third variables to achieve the desired value of the first variable, and means for intermittently energizing said first, second and third units, said first unit including a variable resistance device which will normally be in a de-energized condition, and means for varying the resistance of said variable resistance device in accordance with the value of the first variable, said intermittent energization of said variable resistance device thereby causing said variable resistance device to generate a voltage dependent on the resistance of said variable resistance device when energized, said voltage controlling said second and third units, one of said second and third units including a movable contact and further having a pair of contacts movably mounted in unison and insulated from each other, said movable contact and said pair of contacts being disposed for mutual engagement, one of said movable contact and of said pair of contacts being movable in response to the difference between a desired and actual value of the one variable under the control of said one unit, means for moving the other of said movable contact and of said pair of contacts in accordance with the magnitude of said one variable, and control means for increasing the magnitude of said one variable on engagement between said movable contact and one of said pair of contacts and for decreasing the magnitude of said one variable on engagement between said movable contact and the other of said pair of contacts, the other of the second and third units including a chamber, a diaphragm within said chamber providing a division member between two parts of said chamber, each of said parts including a pressure inlet, one of said inlets receiving a pressure related to the magnitude of the other variable under the control of said other unit, and the inlet to the other of said chamber parts receiving a pressure dependent on the magnitude of said other variable, a further variable resistance device for generating another voltage for employment in the control of the magnitude of said other variable, means for connecting said variable resistance means to said diaphragm and control means under the control of said other voltage for varying the magnitude of said other variable.

16. A control system according to claim 15, wherein the first unit has a still further variable resistance device electrically connected to the first-mentioned variable resistance device for generating a voltage, means for comparing the voltages generated by said devices, and a motor arranged for operation in the event of an out-of-balance between said variable resistance devices and being connected to said further variable resistance device for varying the resistance thereof.

17. A control system according to claim 16, wherein said one unit has a pair of variable resistance devices electrically linked so that a comparison may be made of the voltages given by said devices, one of said devices being connected to the motor of the first unit so that the voltages given by said device will be changed on operation of said motor, and said one unit further including a motor arranged for operation in the event of an out-of-balance between said pair of variable resistance devices and being connected to the other of said variable resistance devices to vary the resistance thereof, and means for connecting said other motor to one of said movable contact and of said pair of contacts to effect the movement thereof.

18. A control system according to claim 16, wherein said other unit includes a further variable resistance device for generating a voltage electrically connected to the first variable resistance device of said other unit, means for comparing the voltages generated by said devices, said further variable resistance device being connected to the motor of the first unit so that the voltage generated by said further variable resistance device will be changed on operation of said motor, and wherein the control means of said other unit is arranged to be operable in the event of an out-of-balance between the said variable resistance devices of said other unit.

19. A control system according to claim 15 including means for increasing one of said second and third variables in advance of increasing the other of said second and third variables, and for decreasing said other of said second and third variables in advance of decreasing said one of said second and third variables.

20. A control system according to claim 15 including means for adjusting the magnitude of the desired value of the first variable.

21. A control system according to claim 15 including means which will present a difference of the first variable from the desired value therefor to the second and third units only when that difference has reached a certain magnitude.

22. A control system according to claim 21 including means for adjusting the amplitude of said difference.

23. A control system according to claim 15 including means for adjusting the ratio of the magnitude of one of the second and third variables to the magnitude of the other of the second and third variables.

24. A control system according to claim 15, wherein the first-mentioned variable resistance device of the first unit comprises a resistance and an electrically conductive member for contact with said resistance, said resistance and said member being mounted for relative movement in directions along the length of said resistance and toward and away therefrom and wherein said intermittent energization means is effected to cause intermittent contact between said member and said resistance.

25. A control system according to claim 24, further comprising means sensitive to the value of the first variable for producing relative movement between said member and said resistance lengthwise of the resistance in accordance with changes in said value.

26. A control system according to claim 25, wherein said resistance is movable to effect a change in the location of the contact point between the resistance and said member along said resistance.

27. A control system according to claim 15, wherein said connecting means of said other unit includes means for adjusting the ratio between the degree of movement of said diaphragm and the resulting degree of adjustment of the first-mentioned variable resistance device of said other unit.

28. A control system according to claim 15, wherein said connecting means of said other unit includes a movable member connected to said diaphragm and extending to the exterior of the chamber and capable of movement with diaphragm displacement, and a lever mechanism operatively connecting said member to the first-mentioned variable resistance device of said other unit, the lever mechanism having a first lever pivotally supported at one end and biased to contact said movable member, a second lever parallel to the first lever and pivotally supported at a first end adjacent the unsupported end of the first lever, a movement transfer member disposed to contact each of the first and second levers in regions thereof intermediate their ends, means for biasing the second lever against the movement transfer member and the movement transfer member against the first lever, and a connection between the free end of the second lever and said first-mentioned variable resistance device of said other unit.

29. A control system according to claim 28 further including adjusting means for adjusting the ratio between the degree of movement of said diaphragm and the degree of adjustment of said first-mentioned variable resistance device, said adjusting means including a slidable connection between said movement transfer member and said first and second levers, and means for changing the position of said movement transfer member along the lengths of said first and second levers.

30. A control system according to claim 15 for a burner installation for a furnace, wherein one of said movable contact and said pair of contacts of said one unit is movable in response to fuel pressure, wherein the pressure in one of the chamber parts of said other unit is responsive to the pressure in the furnace, and wherein the pressure in the other of the chamber parts is responsive to the pressure in a fan chamber for supplying air to the burner installation.

31. A control system according to claim 30 further comprising a fan damper and means for operatively connecting said control means of said second unit to said fan damper.

32. A control system for use with a fuel burner, said system comprising a first electrical circuit responsive to a difference of the heating effect of the burner from a desired heating effect thereof, second and third electrical circuits for respectively controlling fuel and air supply pressures for the burner, said second and third circuits being mutually independent and each being linked to said first control circuit so that a difference of the heating effect of the burner from the desired heating effect will be presented to said second and third circuits for effecting adjustment of the fuel and air supply pressures to achieve the desired heating effect, means for intermittently energizing said first, second and third electrical circuits, and means for allowing, on increase, air supply pressure to attain an equilibrium level in advance of fuel supply pressure and for allowing, on decrease, fuel supply pressure to attain an equilibrium level in advance of air supply pressure.

33. A control system for controlling the magnitudes of first, second and third variables wherein the magnitude of said first variable is dependent on the magnitude of said second and third variables, said control system comprising first electrical circuit means responsive to a difference of said first variable from a desired value of said first variable, second and third electrical circuit means for respectively controlling said second and third variables, said second and third electrical circuit means being mutually independent and each linked to said first electrical circuit means so that a difference of said first variable from the desired value therefor will be presented to said second and third electrical circuit means for effecting adjustment of said second and third variables to achieve the desired value of said first variable, means for intermittently energizing said first, second and third electrical circuit means, and means for allowing, on increase, one of said second and third variables to attain an equilibrium level in advance of the other of said second and third variables, and for allowing, on decrease, said other of said second and third variables to attain an equilibrium level in advance of said one of said second and third variables.

34. A control system according to claim 33 including means for adjusting the magnitude of the desired value of the first variable.

35. A control system according to claim 33 including means which will present a difference of said first variable from the desired value therefor to said second and third electrical circuit means only when that difference has reached a certain magnitude.

36. A control system according to claim 35 including means for adjusting the amplitude of said difference.

37. A control system according to claim 33 including means for adjusting the ratio of the magnitude of one of said second and third variables to the magnitude of the other of said second and third variables.

38. A control system according to claim 33, wherein said first electrical circuit means has a variable resistance device which will normally be in a de-energized condition, and means for varying the resistance of said variable resistance device in accordance with the value of said first variable so that said intermittent energization means will cause said variable resistance device to generate a voltage dependent on the resistance of said device when energized, said voltage being operative to exert a control over said second and third electrical circuit means.

39. A control system according to claim 38, wherein said first electrical circuit means has a further variable resistance device electrically connected to the first-mentioned variable resistance device for generating a voltage, means for comparing the voltages generated by said devices, and a motor arranged for operation in the event of an out-of-balance between said variable resistance devices and being connected to said further variable resistance device for varying the resistance thereof.

40. A control system according to claim 33, wherein said second electrical circuit means has a movable contact and a pair of contacts movably mounted in unison and insulated from each other, said movable contact and said pair of contacts being disposed for mutual engagement, one of said movable contact and said pair of contacts being movable in response to a difference between the desired and actual values of said second variable, means for moving the other of said movable contact and said pair of contacts in accordance with the magnitude of said second variable, and control means for increasing the magnitude of said second variable on engagement between said movable contact and one of said pair of contacts and for decreasing the magnitude of said second variable on engagement between said movable contact and the other of said pair of contacts.

41. A control system according to claim 40, wherein said first electrical circuit means has a motor operable in response to a difference between desired and actual values of said first variable, and wherein said second electrical circuit means has a pair of variable resistance devices electrically linked so that a comparison may be made of the voltages given by said devices, one of said devices being connected to the motor of said first electrical circuit means so that the voltage given by said device will be changed on operation of said motor, said second electrical circuit means further including a motor arranged for operation in the event of an out-of-balance between said pair of variable resistance devices and being connected to the other of said variable resistance devices to vary the resistance thereof, and means for connecting said motor of said second electrical circuit means to one of said movable contact and said pair of contacts to effect the movement thereof.

42. A control system as defined in claim 40 for a burner of a furnace, wherein one of said movable contacts and said pair of contacts of said second electrical circuit means are movable in response to fuel pressure.

43. A control system according to claim 33, wherein said third electrical circuit means has a chamber, a part within said chamber providing a division member between two parts of said chamber, and being, in operation, movable in response to a difference in pressure acting on opposite sides thereof, a pressure inlet to each of said chamber parts, one of said inlets being to receive a pressure related to the magnitude of said third variable, and the other of said inlets being to receive a pressure dependent on the magnitude of said third variable, a variable resistance device for generating a voltage for employment in the control of the magnitude of said third variable, means for connecting said variable resistance device to said movable part, and control means under the control of said voltage for varying the magnitude of said third variable.

44. A control system according to claim 43, wherein said first electrical circuit means has a motor operable in response to a difference between desired and actual values of said first variable, and wherein said third electrical circuit means has a further variable resistance device for generating a voltage and electrically connected to the first-mentioned variable resistance device of said third electrical circuit means, means for comparing the voltages generated by said devices, said further variable resistance device being connected to the motor of said first electrical circuit means so that the voltage generated by said further variable resistance device will be changed on operation of said motor, and wherein the control means of said third electrical circuit means is arranged to be operable in the event of an out-of-balance between the said variable resistance devices of said third electrical circuit means.

45. A control system according to claim 43, wherein said connecting means of said third electrical circuit means includes means for adjusting the ratio between the degree of movement of said movable part and the resulting degree of adjustment of the variable resistance device of said third electrical circuit means.

46. A control system according to claim 43, wherein said connecting means of said third electrical circuit means includes a movable member connected to said movable part and extending to the exterior of the chamber and capable of movement with displacement of said movable part, and a lever mechanism operatively connecting said member to the variable resistance device of said third electrical circuit means, the lever mechanism having a first lever pivotally supported at one end and biased to contact said movable member, a second lever parallel to the first lever and pivotally supported at a first end adjacent the unsupported end of the first lever, a movement transfer member disposed to contact each of the first and second levers in regions thereof intermediate their ends, means for biasing the second lever against the movement transfer member and the movement transfer member against the first lever, and a connection between the free end of the second lever and said variable resistance device of said third electrical circuit means.

47. A control system according to claim 46 further including adjusting means for adjusting the ratio between the degree of movement of said movable part and the degree of adjustment of said variable resistance device, said adjusting means including a slidable connection between said movement transfer member and said first and second levers, and means for changing the position of said movement transfer member along the lengths of said first and second levers.

48. A control system as defined in claim 43 for a burner of a furnace wherein the pressure in one of the chamber parts of said third electrical circuit means is responsive to the pressure in the furnace and wherein the pressure in the other of the chamber parts is responsive to the pressure in a fan chamber for supplying air to the burner.

49. A control system according to claim 48 and further comprising a fan chamber, and means for operatively connecting said control means of said electrical circuit means to said fan chamber.

50. A control system according to claim 33, wherein said first electrical circuit means has a normally de-energized variable resistance device, said variable resistance device including a resistance and an electrically conductive member for contact with said resistance, said resistance and said member being mounted for relative movement in directions along the length of said resistance and toward and away therefrom, and wherein said intermittent energization means is effective to cause intermittent contact between said member and said resistance to generate a voltage dependent on the resistance of said device when energized, said voltage being operative to exert a control over said second and third electrical circuit means.

51. A control system according to claim 50 further comprising means sensitive to the value of said first variable for producing relative movement between said member and said resistance lengthwise of the resistance in accordance with changes in said value.

52. A control system according to claim 51, wherein said resistance is movable to effect a change in the location of the contact point between the resistance and said member along said resistance.

References Cited

UNITED STATES PATENTS

| | | | |
|---|---|---|---|
| 1,789,863 | 1/1931 | Buchting et al. | 236—26 |
| 1,855,559 | 4/1932 | Peabody | 236—26 |
| 2,335,471 | 11/1943 | Ashcraft | 158—115 |
| 2,371,732 | 3/1945 | Bristol | 338—40 X |

FOREIGN PATENTS

| | | |
|---|---|---|
| 686,159 | 1/1940 | Germany. |

EDWARD J. MICHAEL, *Primary Examiner.*